(12) United States Patent
Walters et al.

(10) Patent No.: US 11,748,631 B2
(45) Date of Patent: Sep. 5, 2023

(54) GENETIC MODELING FOR ATTRIBUTE SELECTION WITHIN A CLUSTER

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/992,991

(22) Filed: Aug. 13, 2020

(65) Prior Publication Data

US 2022/0051107 A1 Feb. 17, 2022

(51) Int. Cl.
  *G06Q 30/02* (2023.01)
  *G06N 3/126* (2023.01)
  *G06Q 40/02* (2023.01)
  *G06Q 30/0201* (2023.01)

(52) U.S. Cl.
  CPC ......... *G06N 3/126* (2013.01); *G06Q 30/0201* (2013.01); *G06Q 40/02* (2013.01)

(58) Field of Classification Search
  CPC ..... G06N 3/126; G06Q 30/0201; G06Q 40/02
  See application file for complete search history.

(56) References Cited

U.S. PATENT DOCUMENTS

| | | | | |
|---|---|---|---|---|
| 5,970,487 | A * | 10/1999 | Shackleford | G06N 3/126 707/999.102 |
| 6,928,434 | B1 * | 8/2005 | Choi | G06Q 20/207 |
| 7,730,002 | B2 * | 6/2010 | Afeyan | G06N 7/01 706/45 |
| 9,324,023 | B2 | 4/2016 | Otto et al. | |
| 10,504,126 | B2 | 12/2019 | Kulkarni et al. | |
| 2003/0046130 | A1 * | 3/2003 | Golightly | G06Q 30/0202 705/7.24 |

(Continued)

OTHER PUBLICATIONS

K. S. Tang, K. F. Man, S. Kwong and Q. He, "Genetic algorithms and their applications," in IEEE Signal Processing Magazine, vol. 13, No. 6, pp. 22-37, Nov. 1996, doi: 10.1109/79.543973. (Year: 1996).*

(Continued)

*Primary Examiner* — Eric R Netzloff
(74) *Attorney, Agent, or Firm* — Sterne, Kessler, Goldstein & Fox P.L.L.C.

(57) ABSTRACT

Genetic modeling is used to generate new term sets from existing term sets within a population cluster. Term attributes corresponding to a first plurality of term sets are encoded as genes for a computer-executed genetic algorithm. Clients are clustered in categories based on client attributes. The genetics algorithm is applied to a category of clustered clients to distribute the term sets to clients in the category. A first subset of terms sets is removed after receiving, within a first duration of time, a number of client responses that falls below a first threshold. A second subset of term sets is retained after receiving, within a second duration of time, a number of client responses above a second threshold. The second subset is bred using the genetic algorithm and a second plurality of term sets is generated based on the results.

20 Claims, 4 Drawing Sheets

(56) References Cited

U.S. PATENT DOCUMENTS

| | | | |
|---|---|---|---|
| 2003/0088458 A1* | 5/2003 | Afeyan | G06N 3/126 706/13 |
| 2003/0144907 A1* | 7/2003 | Cohen, Jr. | G06Q 30/0269 705/14.66 |
| 2005/0261953 A1* | 11/2005 | Malek | G06Q 30/0201 705/7.32 |
| 2006/0271441 A1 | 11/2006 | Mueller et al. | |
| 2007/0255621 A1* | 11/2007 | Mason | G06Q 30/0242 705/14.41 |
| 2008/0208787 A1* | 8/2008 | Luchene | G06N 5/025 706/47 |
| 2009/0276309 A1* | 11/2009 | Otto | G06Q 30/0264 705/14.25 |
| 2010/0131390 A1* | 5/2010 | Emswiler | G06Q 30/08 705/26.1 |
| 2013/0124440 A1* | 5/2013 | Hodjat | G06N 3/126 706/13 |
| 2013/0282626 A1* | 10/2013 | White | G06F 40/00 706/11 |
| 2015/0339709 A1* | 11/2015 | Otto | G06Q 30/0253 705/80 |
| 2016/0232546 A1 | 8/2016 | Ranft et al. | |
| 2017/0243244 A1* | 8/2017 | Trabelsi | G06Q 30/0255 |
| 2018/0165706 A1* | 6/2018 | Feng | G06Q 30/0244 |
| 2018/0276718 A1* | 9/2018 | Thomas | G06Q 30/0276 |
| 2019/0213660 A1* | 7/2019 | Astrada | G06F 16/9535 |
| 2020/0193322 A1* | 6/2020 | Korada | G06F 16/958 |
| 2020/0293835 A1* | 9/2020 | Doni | G06F 11/3409 |
| 2021/0109897 A1* | 4/2021 | Brechbuhl | G06Q 10/10 |
| 2021/0328961 A1* | 10/2021 | Senftleber | H04L 51/20 |

OTHER PUBLICATIONS

I. Wanliang Fu, "Application of the Genetic Algorithm in the process of the distributing credit card," 2012 IEEE International Conference on Computer Science and Automation Engineering, Beijing, China, 2012, pp. 399-402, doi: 10.1109/ICSESS.2012.6269489. (Year: 2012).*

* cited by examiner

GENETIC MODELING FOR ATTRIBUTE SELECTION WITHIN A CLUSTER

BACKGROUND

Genetic algorithms are so named because they are performed to mimic gene-based reproduction in nature. Various attributes occur in a population, which are passed down to subsequent offspring in the population. Over time, the more useful attributes and traits tend to survive. Through this survival, some traits may even be more pronounced as the utility of the attribute grows along the timeline of the population. On the other hand, less useful (or even harmful) traits will be eliminated through natural selection. In a computing sense, genetic algorithms perform similar computations and calculations, causing helpful attributes in automatic decisioning scenarios to be passed on and removing traits that are not helpful at best or are harmful at worst.

DETAILED DESCRIPTION

Figure 1:
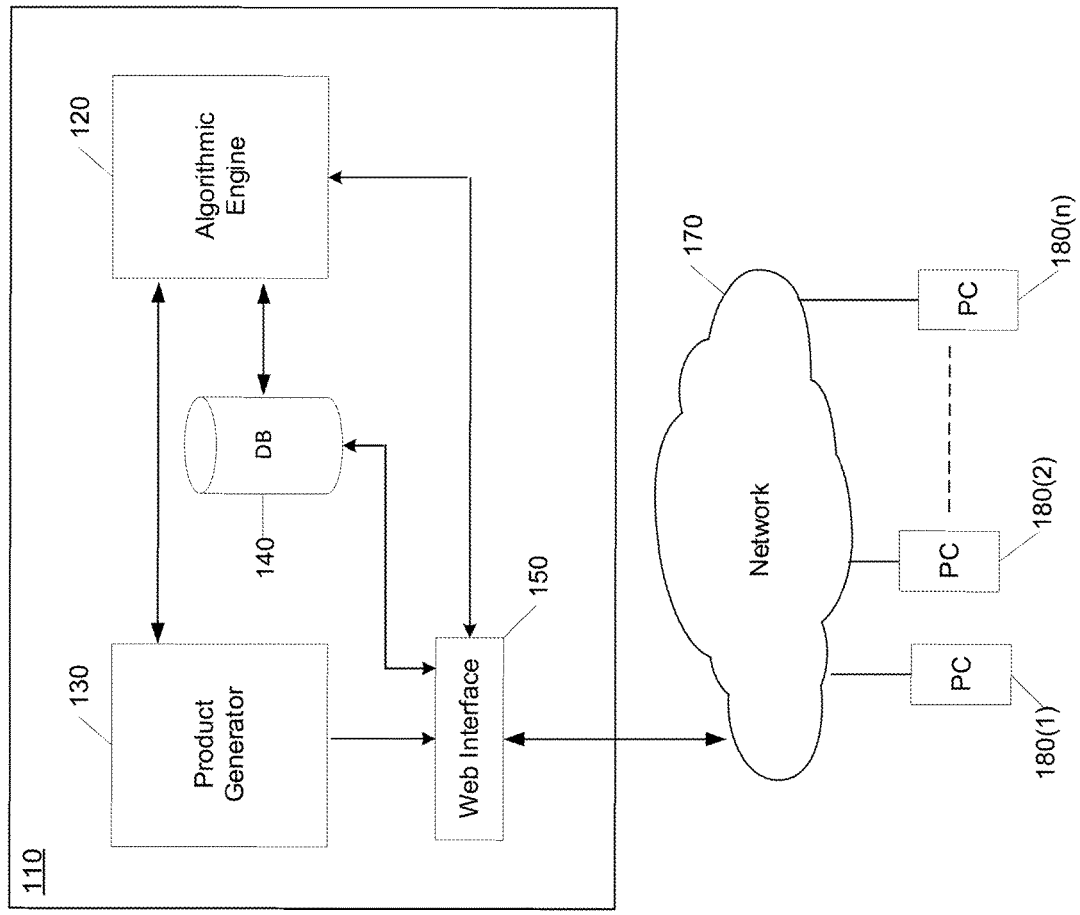
FIG. 1 is a system for algorithmically improving electronic delivery channels, according to an embodiment of the disclosure.

The Internet has exponentially increased the ability to reach people. As is the case with previous print and broadcast media, web sites and emails can be used to inform, organize, motivate or advertise. Regardless of the reach of any medium, the message itself should be aligned to present appropriate content to the optimal recipients in the proper manner in order to achieve the desired results. Nowhere is this alignment more relevant than in transmitting offers in hopes that potential customers will respond positively to specific products, terms, or available deals. Increasingly, machine learning (ML) and artificial intelligence (AI) are being used to analyze and improve these transmissions for technologically optimized results.

Decades of evolution in broadcast media started with improvements in message calibration. Later, timing calibration, e.g., detecting the most-effective timeslot and/or correct program to reach targets as network delivery matured, gave way in the cable era to channel calibration targeting delivery on the most-effective network. The evolution of internet and email has taken this one step further, trying to calibrate both the message and the "channel". For example, formats on various web sites can be modified to target the best audience, as can the form of email with messaging to best resonate with recipients. This shift to tuning multiple aspects of the messaging greatly complicates the technical requirements of the process as targeted messaging brings with it a desire to track, compile and analyze exponentially greater amounts of data.

While the amounts of data involved in such endeavors are daunting, algorithmic solutions can help overcome these obstacles. Both ML and AI may be used to aid in the categorization or sorting of data, analysis of outcomes, and determination of patterns across vast data sets that would simply be impossible if attempted using brute force calculation by those data scientists acquiring the data. Moreover, some of the patterns detected by this type of analysis can go undetected in the absence of the disclosed solutions. The algorithmic determinations can yield results that would not be investigated or would be otherwise counterintuitive if relying on purely human analytical means.

To achieve electronic communication analysis and optimization, various embodiments of the present application will be described that employ a combination of clustering algorithms and genetic algorithms. According to embodiments, these algorithms are used to generate portions of communications that are used in offers to clients. The algorithms update the communications based on transmission and reception patterns over time. As various combinations of attributes contained with the messaging are successful (e.g., both transmitted as an outbound offer and received as an inbound acceptance back to the original transmitter), they will be retained. Retained attributes will form the basis of subsequent messages with subsequent offers. Conversely, unsuccessful attributes will be discarded. Additional offers are then generated having at least a portion of those same successful attributes or variations on those attributes which have been analyzed as improving the likelihood of a successful transmission and reception as seen from the viewpoint of the original transmitter. In such a way, messages can be specialized for a given population in an effort to produce the highest likelihood of response, resulting in resource optimization and efficiency improvements.

Embodiments of the present disclosure apply the use of genetic algorithms to message delivery, thereby improving the technical efficacy of delivery channels that involve a great number of interconnected variables, while reducing or eliminating ineffective channels more quickly. Data sets used by the described embodiments will be primarily divided into two sets. The first are a set of attributes referred to as "term sets", which describe the various parameters or features included in the outbound communications and which undergo the genetic algorithm process.

As examples, the term sets in the aggregate can be credit offers on financial products, such as credit card offers. The attributes of the term sets can be various variables that make up a credit card agreement, such as the limit on the credit line, the effective interest rate charged for use of the card, physical attributes of the card such as material or design, fees associated with the card, a rewards structure (airline miles, cash back, etc.), or other variables. These offers may be transmitted to recipients with sufficient information such that a given recipient can accept a corresponding received offer. It is recognized that different offers may be more attractive to different categories of recipients, such that a given recipient may be more likely to accept an offer having one set of terms versus another offer having a different set of terms.

While a credit card offer is noted here, the communication may include any type of term sets used to elicit a response from a recipient, such as other types of credit offers—mortgage financing or refinancing, automotive loans, educational (re)financing, home equity line of credit (HELOC) offers, or other varieties of secured or unsecured loans—marketing materials, incentives, and the like. Thus based on each of the examples above, term sets include any attributes that can be deemed result-effective variables contributing, at least partially, to the success of the transmissions described.

A second set of attributes will also be part of the algorithmic improvements described below, which are described as "client attributes" used in categorization by the clustering algorithm. Client attributes are the demographic aspects of prospective recipients (clients) such as age, gender, educational background, geographic location, income, occupation, credit rating/history, or any other piece of information that can be analyzed during the communication process. Unlike the term sets, which can be altered to some degree by the transmitter in order to alter the overall offer, the client attributes are fixed according to the pool of potential customers available to the transmitter. Thus, according to embodiments, an offer or set of offers can be transmitted to a category of clients as determined by the clustering algorithm. For example, a specified offer can be sent to all clients in the U.S. state of Arizona, who are over the age of 70, and with income of $50,000 or more. Or, a set of different offers may be sent to the same population of clients, the different offers being distributed across the population to track a response rate. Other examples with different variables and client attributes will be apparent to one of skill in the relevant arts.

While all communications typically involve two parties, messaging can flow in a single direction (e.g., broadcast/cable television, billboards, web sites, print/web advertising) or in two directions (e.g., telephone calls, video conferencing applications, instant messaging, etc.). In the case of two-way communications, an initial message can be transmitted by a first party, which is received by the second party. A response is then transmitted by the second party and presumably received by the first party. Unless noted specifically otherwise, the following descriptions will discuss transmissions and receptions from the perspective of the originating party, i.e., the first party to the communication process. Thus, a "transmission" or a "transmitted message" is a communication transmitted from the entity performing the algorithmic analysis to a client having one or more term sets offered. Conversely, a "reception" or "received message" is a communication received by the original transmitter from the client accepting a term set in the previous transmission. A "completed" or "successful" message will be a combination of the two communications, i.e., a transmission and a reception.

In some embodiments of the present invention, the transmitter can optimize the process to improve the rate of completed or successful messages, i.e., to reduce the number of transmissions needed in order to receive a response from a particular client. If a variety of term sets are transmitted to a cluster of clients, but only certain term sets result in completed responses, the incomplete messages can help inform the genetic algorithm. As new messages are transmitted to similarly categorized clients, those term sets or underlying attributes that were previously unsuccessful need not be used.

For example, a transmitter may wish to send messages containing credit card offers as the term sets. The transmitter may have, for example and without limitation, five options for APR charged on purchases, four options for annual fees charged, three rewards programs, and five credit limits at which an account can be opened as the term attributes of these term sets. Given these attributes, there are 300 distinct term sets that can be transmitted based on the various combinations.

In some embodiments, the transmitter can have clients categorized into clusters based on client attributes of, for example and without limitation, geography, age, and income. As an example, a clustering algorithm used to categorize the clients into the clusters can be a distributive clustering algorithm performed on a population. The algorithm can have, for example and without limitation, three geographic distributions, three age distributions, and three income distributions. Using this clustering algorithm, a population of one thousand clients can be categorized into a number of different groups based on these categories (potentially as many as 27 different groups, although each combination may not be present based on the particular set of one thousand clients). Based on the attributes of the overall population of one thousand, the clustering algorithm may determine that one third are older than 55 years old, one third younger than 30 years old, and one third in between 30 and 55. Likewise, the client population might have one third between $40,000 and $90,000 in annual income, with a third above and below those thresholds. Finally, the geography may be broken into an Eastern third, Central third, and Western third. While this example refers to "thirds," one of skill in the art will recognize that the categories need not be equal in size or distribution.

With this example, one category may be a group including clients over 55 years old, with income between $40,000 and $90,000 per year, who reside in the Eastern U.S. Another category may be a group including clients under 30 years old, with income less than $40,000 per year, who reside in the Western U.S. Yet another category may be a group including clients between the ages of 30 and 55, with income over $90,000 per year, who are part of the Central U.S. Additional categories would be apparent to one skilled in the relevant art.

Once categorized, messages can be sent to clients on a one-time or routine basis offering, for example, one of 12 different term sets (credit cards). The messages can be sent to the entire population, or to one or more of the categories (sub-populations). These messages can be sent until one of the terms sets is part of a completed transmission (accepted) or until each different term set has been transmitted (regardless of success). Thus, over the course of three months, each of the 12 different term sets will be transmitted to one or more categories of clients.

Using the genetic algorithm with these groupings, the term attributes can be better optimized in order to increase the rate at which communications result in successful transmissions based on completed messages over time. For example, after the initial three-month period, there may be no completed transmissions involving a high fee term and a cohort of younger clients. As a result of the breeding process for this population, a high fee attribute in a term set may be phased out such that it is no longer included in term sets transmitted to a category of under 30-year-old clients. Similarly, there could be very few completed transmissions for term sets including a high interest rate sent to categories of Central or Western clients. On the other hand, high interest rate cards may have generated numerous completed transmissions in Eastern groupings of under 30 clients, regardless of income level. Thus, each attribute will be bred into or eliminated from future "generations" of transmissions for clients in those enumerated categories.

Continuing the above example, if transmissions were sent to each of the 27 categories created by the clustering algorithm, processing by the genetic algorithm can be carried out for all categories. Carrying out this processing of the genetic algorithm completes a generation of the overall process. Each category can be considered its own sub-population and surviving or dying traits will be determined for each category (i.e., each has its own "gene pool").

Continuing the above example of clients under the age of 30 not responding to high fee term sets, the high fee attribute can "die" out of each category having clients under 30. The same can happen for the high interest rate attribute in the Central or Western client populations or categories. Conversely, the high interest rate attribute may be bred into every term set sent to a subsequent group of Eastern clients under the age of 30, because of that attribute's inclusion in successful term sets among that category of clients.

The processes described above and below are iterative, where successful attributes propagate through each generation of offers while unsuccessful attributes are more quickly removed from further messaging. Certain periods of time can be used to determine if the various term sets are successful or not. For instance, the time period measured to retain a set of terms for the genetic algorithm may be longer than the time period measured to determine an unsuccessful subset of term sets. In much the same manner, some clusters may operate on different time periods than other clusters. Clusters involving older clients may take longer to complete transmissions, while clusters with younger clients may be detected as only completing successful transmissions in a very short span of time.

Specified thresholds for retaining or removing genes may vary depending on the cluster as well. As an example, clusters having older clients may be less likely to complete any transmissions, regardless of terms, and therefore only a few successful transmissions may result in retention of an attribute (e.g., five complete transmissions results in retention). High-income clusters may complete a relatively large number of transmissions, but may also close some non-trivial proportion of those cards quickly after the successful transmission. In that case, the rate of complete transmissions for high-income categories may need to be significantly higher than for other clusters (for example, requiring that sixty percent of all transmissions be completed in order to retain the gene).

Finally, if an external event renders previous results suspect (such as a systemic change, a macro-economic shock, a natural disaster, etc.), the overall process involving both the genetic and clustering algorithms can be re-started to reflect the fundamental changes in underlying assumptions or conditions. For example, a stock market crash could be found to alter the behavior of any group with older clients, so that the genetic algorithm processes need to be essentially "reset" to reflect the post-crash behaviors of those clusters. A natural disaster could affect all members of a geographic cluster and alter behavior. Global geopolitical events could create conditions so different from the start of the analysis that all potential clients need be re-clustered because of a wide drop in income across the entire population, not just a single cluster, while their habits in completing transmissions are re-analyzed.

Systems, methods and media are described below to algorithmically improve electronic delivery channels transmitting offers having terms or sets of terms (i.e., products). An environment 100 is depicted in FIG. 1, in which a system 110 operates to automatically generate new combinations of term sets for a variety of electronic delivery channels. Environment 100 includes generation system 110, network 170 and a plurality of personal computing devices 180(1) to 180(n). Network 170 can be a local area network (LAN), a wireless LAN (WLAN), a wide-area network (WAN), or more broadly be the internet or a cloud-based network. Network 170 and the plurality of personal computing devices 180(1) to 180(n) will be understood by one of skill in the relevant arts, and thus will not be described in further detail for the sake of brevity.

Generation system 110 includes an algorithmic engine 120, a product generator 130, a database 140, and a web interface 150. Algorithmic engine 120 includes one or more processors configured to communicate with product generator 130 and database 140. The one or more processors are further configured to receive client information and a first plurality of term sets from database 140. Algorithmic engine 120 is configured to cluster clients into categories based on client information stored in database 140. The clustering is performed by algorithmic engine 120 according to a clustering algorithm.

The clustering algorithm used by algorithmic engine 120 to group the clients can be any type of clustering algorithm. For example, a nearest neighbor or K-nearest neighbor algorithm can be used, encoding the information as vector information for the purposes of analysis. If the client information is represented by vector information, any spatial clustering method like a mean square algorithm can be used for analysis. Likewise, a distributive clustering algorithm or a density-based clustering algorithm can be used, such as a Gaussian distribution. Any other alternative algorithm suitable for clustering clients based on the client attributes can be used and would be readily apparent to those of skill in the relevant art. The specifics of many machine learning or artificial intelligence methods can be employed and will not be further described for sake of brevity.

Algorithmic engine 120 is further configured to encode genes corresponding to attributes in the first plurality of term sets. As noted above, the attributes of the term sets themselves, such as interest rates, limits or fees, are encoded as the genetic component ("genes") to a genetic algorithm. The numbers of features are not limited to the above-noted examples, but can encompass virtually any describable feature of a product. The genes are encoded for use by a computer-executed genetic algorithm, which is also carried out by processors in algorithmic engine 120.

Through operation of the genetic algorithm, algorithmic engine 120 is configured to remove, for a given population cluster, a first subset of term sets from among the first plurality of term sets after a first duration of time. The removal of the first subset of term sets occurs responsive to receiving a number of client responses to the term sets below a first threshold. For instance, the first threshold can be a percentage of total term sets accepted as opposed to those that were transmitted. Taking this example one step further, a threshold of at least 5% of the number of transmitted term sets can be established as the first threshold. Other percentages are possible, higher or lower than this figure, such as 0.1%, 1%, 10%, 20% or 50%.

As another example, the first threshold can be a total number of responses received. In a total number regime, the first subset of terms can be removed if fewer than 50 responses are received that accept the first subset of terms. Other total figures above and below 50, such as 5 or 50,000, can be used, and would generally be based on the number of transmissions of the first subset of terms. There are additional metrics for setting this threshold and subsequently measuring against the threshold that will be readily apparent to one skilled in the relevant art, such as a rate of returns (e.g., 50 per day) or a rate of percentage returns (e.g., 2% per month) if the transmissions are not evenly distributed, temporally speaking. Regardless of the specific threshold, the corresponding genes of the removed term sets are also removed from a gene pool for the computer-executed genetic algorithm. For the purposes of this description, the gene pool will be understood to be stored in database 140, in a memory used by algorithmic engine 120, a separate storage used for this purpose, or in some combination thereof.

Algorithmic engine 120 is configured to retain, for a given population cluster, a second subset of term sets from among the first plurality of term sets as successful term sets after a second duration of time. The retaining of the second subset is responsive to receiving a number of positive client responses to the term sets above a second threshold. The method of setting and measuring the second threshold can be similar to those examples given above for the first threshold, though it need not be. As an example, the first threshold may be identified using a minimum total number (e.g., if the number of received responses is less than 100 in a month, the term set is removed), regardless of the number of term sets that are transmitted. The second threshold may delineate a percentage of received acceptances which qualify as successful (e.g., if 5% of transmissions receive a response, the term set is retained). As opposed to the removed subset above, corresponding genes of the successful term sets are retained in the gene pool for the computer-executed genetic algorithm.

In some embodiments, the second duration of time can be longer than the first duration of time when evaluating the success or failure of the transmitted term sets, somewhat depending on the thresholds selected. As an example, a very low first threshold can be selected to ensure the continued survival of the term sets if the most basic of levels has been met (e.g., 50 or 100 completed transmission and reception pairs). A higher second threshold may be used for the actual retention of attributes for future breeding purposes (e.g., 10% of term sets that originally number in the tens of thousands and continuously add new transmissions). Thus, a longer period of time may be selected to provide sufficient opportunity for the second threshold to be met against the relatively smaller first threshold.

The different thresholds may also be proportional. For instance, a threshold of 100 positive receptions in one month can be set to avoid removal, providing a small initial threshold. However, a threshold of 300 positive receptions in three months can be used for retention purposes. These two figures can be employed to ensure that the small initial flow of completed transmissions is, at the very least, steady and sustainable. On the other hand, proportionality is not a requirement as there may be a preference to avoid having a sufficiently high initial number of completed transmissions automatically translating to a met second threshold. Lastly, the thresholds can be related by some factor, such as the second threshold being five times the first threshold while the second time period is twice as long as the first time period. All of the above permutations are merely examples, and other combinations of thresholds will be apparent to one of skill in the relevant arts.

Intuitively, the second threshold will likely be measured against a longer period of time in most cases, regardless of the actual thresholds selected. If the time period allotted for the first threshold is longer than the time period for the second, then the first subset of term sets never "dies" before the breeding takes place. In other words, if breeding occurs before the first time period ends, then it can become a never-ending cycle of sustained, non-completed messages. While the failure to reach the second threshold prevents these attributes from being bred into subsequent generations, failure to reach the first time period keeps these non-performing attributes and term sets alive.

Returning to FIG. 1, after the relevant time periods have passed, algorithmic engine 120 breeds the second subset of term sets using the genetic algorithm. The result of this breeding is a second plurality of term sets having attributes from successful term sets and avoiding the attributes of unsuccessful term sets. The processor can be configured to generate the second plurality of term sets such that the generating results in new term sets not found in the first plurality of term sets. As an example, an annual percentage rate (APR) charged for interest on balances in one term set that was successful for a given category of customer (i.e., client cluster) can be combined with a rewards structure that was successful for another term set for the same category of customer, even if the two were previously not offered in combination.

The processor can also be configured to generate the second plurality of term sets such that the breeding results in new attributes not found previously in the gene pool. These results can be attributes that are within ranges between the attributes of other successful term sets. For example, if term sets are successful with both a 10 percent APR and a 12 percent APR, breeding of either term set might result in a second-generation term set having an 11 percent APR. Alternatively, any other acceptable value between boundary rates may occur as a result of the breeding of the successful term sets, such as half-percentage point intervals, quarter-percentage point intervals, or tenth-of-a-percent intervals between the two first-generation APRs.

As a further example of possible new attributes, successful traits may be reproduced in a more exaggerated fashion. This will mimic the manner in which successful traits in nature can lead to more pronounced versions of the same features (e.g., height increases in subsequent generations for the advantage of reaching high-placed food). For instance, if 12 percent APR term sets are unsuccessful, but 10 percent APR term sets are successful, then new term sets may be generated having a term below 10 percent. Other attributes such as limits, fees, and rewards can be modified in a like manner as well, although examples of this outcome are not so limited to the above list.

One of the advantages of machine learning and AI analysis of the term sets, attributes and client information, is that "higher order" dissection is possible. As an example, the above description of successful traits may be too simplistic when viewing each trait individually, but patterns may appear when viewed in combinations that data scientists would otherwise overlook. Using some of the above-described attributes, a pattern may not emerge with simply a credit limit or a rewards structure. However, a combination of a specific rewards structure (e.g., a program with airline miles redeemable across all airlines) added to a credit limit above a certain threshold may trigger successful message completion, whereas those attributes individually would not. As an alternative, a combination of APR and fees can produce a completed message cycle of transmission and acceptance. These are just two examples and other combinations, sub-combinations, and permutations of terms within the various term sets, which can yield patterns after analysis and any combination may be contemplated within the scope of this application.

Database 140 can contain the above-mentioned client information, as well as pluralities of term sets. In some embodiments, the term sets generated by product generator 130 can be stored in database 140 so as to associate prospective client information with the term sets prior to transmitting them to algorithmic engine 120. In alternative embodiments, the client information from database 140 can be transmitted to algorithmic engine 120 and associated with the term sets generated by product generator 130 as a function of algorithmic engine 120.

While shown as a single database 140, the implementation may result in multiple databases being used, depending on the information being accessed. Database 140 may be a stand-alone database or part of a larger repository. Database 140 may be a cloud-implemented datastore, housed at various locations. Database 140 may be an integrated portion of generation system 110, or merely accessed by the other components of generation system 110 in some other fashion. Other aspects of database 140 may be varied as will be expected by one skilled in the relevant art of data management and data storage.

The system 110 further includes web interface 150 configured to receive each of the plurality of terms sets generated by the algorithmic engine 120 or product generator 130. The web interface 150 is further configured to transmit each of the plurality of term sets to the clients via network 170. As an example, web interface 150 can format the term sets into emails for deliveries to email addresses of potential customers. In an alternative embodiment, web interface 150 can format the generated term sets into offers available through web advertising. If web interface 150 creates web advertising offers from the generated term sets, various forms of locating ads may be used, such as banner ads on web sites, embedded ads in various games or applications, or as part of an interface through messaging services and platforms. Other means of internet delivery can possible and contemplated within the equivalents of web interface 150. In some embodiments, instead of or in addition to exchanging messages through a network or through web interface 150, a record of message transmission and acceptance can be entered directly into database 140, in association with the respective term sets and populations identified by algorithmic engine 120. This may be useful, for example, when some messages are not sent electronically but rather are delivered physically, through direct mailings, leaflets, and the like.

Returning to the above example, once the second plurality of term sets is generated by algorithmic engine 120, that second plurality can be distributed among clients in the same category of clients, with an increased likelihood of success. The processes carried out by algorithmic engine 120 outlined above can be repeated for future generations of term sets as well. Algorithmic engine 120 is further configured to remove, retain, and generate subsequent pluralities of term sets for a given population cluster based on subsequent iterations of breeding the genetic algorithm. As an automatic process, each iteration can be implemented without changing the underlying assumptions and parameters.

For instance, the thresholds and time durations can be retained from iteration to iteration. Doing so allows for consistent evaluation of the effectiveness of attributes in term sets leading to completed communications. As noted above, if underlying conditions change, parameters can be altered manually or automatically to reflect those changes. Relatedly, if analysis of the parameters determines that a longer or shorter duration is better suited for one of the threshold measurements, or that the thresholds themselves should be raised or lowered, the embodiments allow for intervention to do so.

While the components of FIG. 1 have been shown and described with particular boundaries and communications pathways, one of skill in the relevant art will recognize that various configurations will be possible within the scope of this application. For example, algorithmic engine 120 can be implemented as a sub-component of product generator 130, or vice versa. Likewise, web interface 150 may be integrated with product generator 130, alone or in combination with algorithmic engine 120. Database 140 may or may not have direct, two-way communications with other components in various alternate embodiments of system 110, being either routed through another sub-component or employing only one-way communication as appropriate. In fact, any of the communications pathways or directions can be altered based on reconfigurations or technical specifications.

Figure 2:
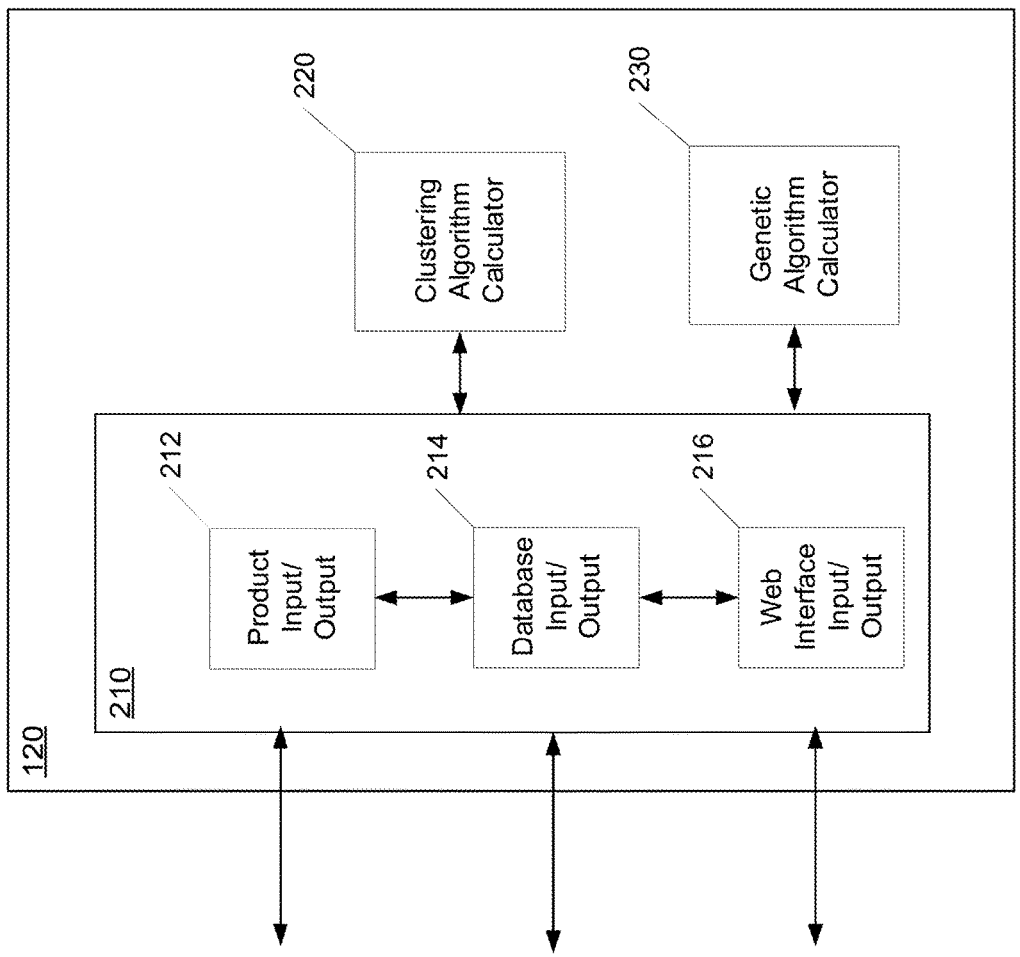
FIG. 2 is an algorithmic engine for improving electronic delivery channels, according to an embodiment of the disclosure.

An algorithmic engine 120 for improving electronic delivery channels as shown in FIG. 1, or substantially similar to the one shown in FIG. 1, is depicted in greater detail in FIG. 2. Algorithmic engine 120 includes an input/output interface 210, a clustering algorithm calculator 220, and a genetic algorithm calculator 230 amongst its features. Input/output interface 210 further shows a product input/output 212, database input/output 214, and web interface input/output 216 as sub-components. While each of the components of algorithmic engine 120 have been shown in a particular configuration, one skilled in the relevant art will appreciate that different arrangements of similar features are possible.

For example, input/output interface 210, as depicted in FIG. 2, is in two-way communication with product generator 130, database 140, and web interface 150. Input/output interface 210 also receives input or output from clustering algorithm calculator 220 and genetic algorithm calculator 230 as depicted. As shown in FIG. 2, input/output interface 210 is configured to process the term sets (i.e., products) received from the product generator, as well as communicate with database 140, so as to provide the combined term sets and pertinent database information to the algorithm calculators 220 and 230. Input/output interface 210 is also shown receiving input and output from genetic algorithm calculator 230 and clustering algorithm calculator 220, so that it may be properly routed for eventual delivery to clients/users via, for example, web interface 150 shown in FIG. 1.

Input/output interface 210 has been depicted as a single interface with individual sub-components. However, each of product input/output 212, database input/output 214, or web interface input/output 216 can be implemented separately or as part of a broader interface for additional functionality. The communication pathways indicated are also merely examples, and an integrated interface unit can also alter the logically appropriate or most convenient connections. Other modifications are also possible, depending on other integrated components found in, and alterations to, the configuration of system 110 as shown in FIG. 1.

Much like the interfaces as described above, the algorithm calculators 220 and 230 can be configured differently than shown and described herein. In an alternative embodiment, if a single algorithm calculator is provided, the communication pathways and pertinent interfaces may be reduced. In yet additional embodiments, more calculators or interfaces may be provided. For instance, multiple clustering algorithm calculators may be provided in order to select from among a variety of clustering algorithms. If a selection between clustering algorithms and clustering algorithm calculators is configured, then appropriate selection by either the genetic algorithm calculator 230, by the input-output interface 210 or by some other component or sub-component not shown here, can be implemented. Additional modifications to the algorithm calculators will be apparent for those skilled in the relevant arts of artificial intelligence and data science.

Figure 3:
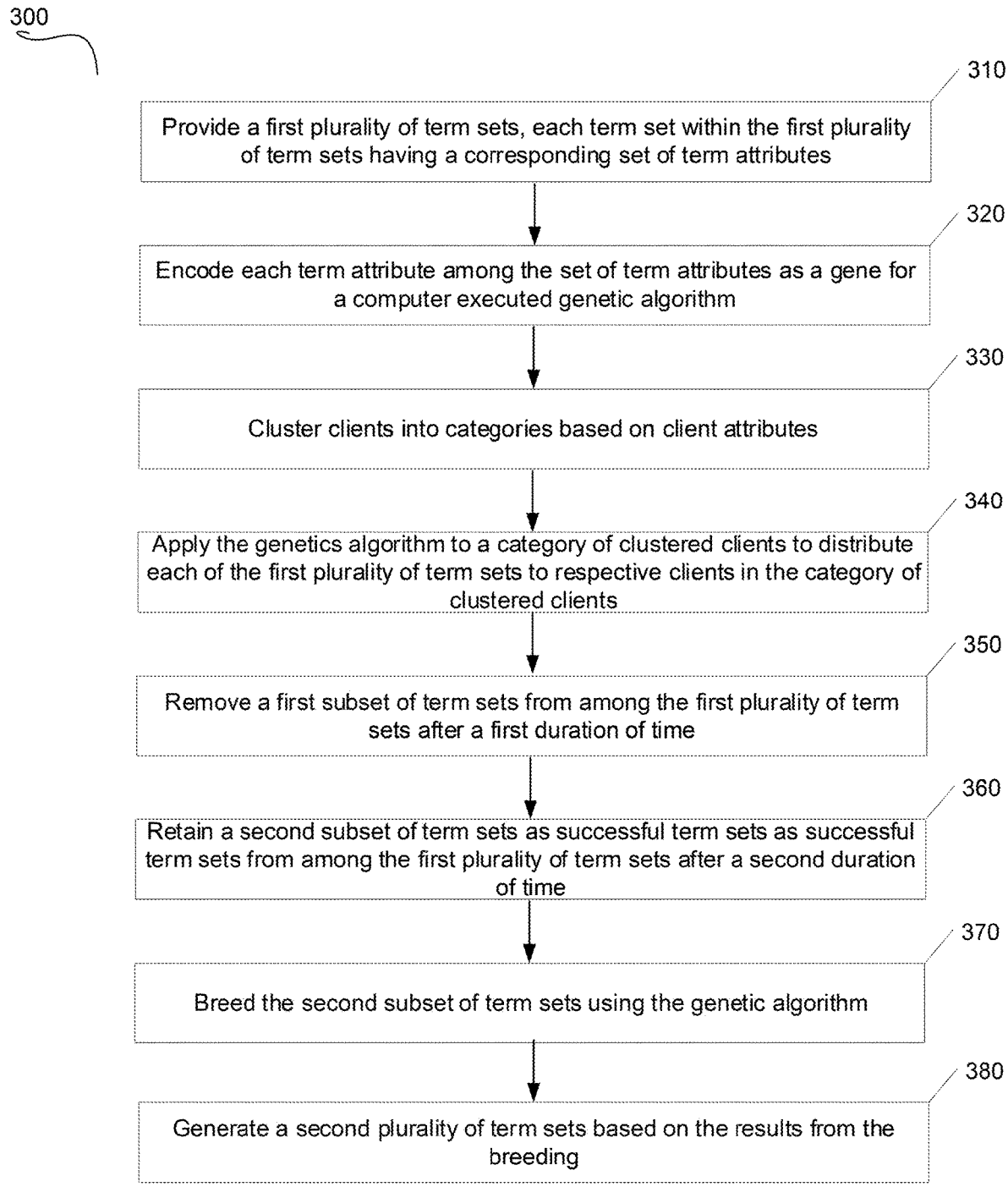
FIG. 3 is a method of improving electronic delivery channels algorithmically, according to an embodiment of the disclosure.

Turning now to FIG. 3, a method of automatically generating new sets of terms from existing sets of terms is depicted. At a step 310, term sets forming a first plurality of term sets are provided. The term sets provided at step 310 can be substantially similar to those described above as generated by product generator 130 in FIG. 1. Each term set within the first plurality of term sets has attributes. As an example, the first plurality of term sets can include several credit card offers for potential customers. The credit card offers can vary by the attributes included in each, such as by the interest rate on purchases, credit limits, annual fees and/or rewards programs (e.g., cash back, airline miles, points in a hotel chain program, etc.). Thus, a variety of combinations having different groupings of attributes will result.

At a step 320, each attribute among the set of attributes is encoded as a gene for a computer-executed genetic algorithm. The encoding can be completed by one or more processors, such as ones that can be found in algorithmic engine 120 shown in FIG. 1, or more specifically those in genetic algorithmic calculator 230 in FIG. 2. Using the example of a credit card offer above, each instance/option of the interest rates, fees, limits, rewards and other attributes can be encoded as genes.

At a step 330, clients are clustered into categories based on client attributes. The clustering can be completed by one or more processors, such as ones that can be found in algorithmic engine 120 shown in FIG. 1, or more specifically those in clustering algorithmic calculator 220 in FIG. 2. The client attributes correspond to attributes of clients to whom the term sets are to be transmitted, which can include such attributes as age, gender, educational background, geographic location, income, occupation, credit rating/history, or other piece of demographic information. Any one of several known clustering algorithms can be used. For example, a k-nearest neighbor clustering algorithm or a Gaussian distribution can be used.

At a step 340, the computer-executed genetics algorithm is applied to a category of clustered clients to distribute each of the first plurality of term sets to respective clients in the category of clustered clients. For example, the first plurality of term sets can be sent to a category of clients having specific client attributes regarding age, geographical location, and credit ratings. The distribution can be accomplished by a web interface, such as web interface 150 as shown in FIG. 1 and described above, and/or using physical documents to transmit the term sets to clients.

Returning to FIG. 3, at a step 350, a first subset of term sets from among the first plurality of term sets is removed after a first duration of time. The removing is responsive to receiving a number of client responses to the term sets below a first threshold. As one example, the first subset of terms can be removed for those term sets having fewer than 50 completed (accepted) messages within one month of transmission. The corresponding genes of the removed term sets are removed from the gene pool (i.e., database 140 of FIG. 1 or similar) for the computer-executed genetic algorithm for that population cluster.

At a step 360 of FIG. 3, a second subset of term sets from among the first plurality of term sets is retained as successful term sets for that population cluster after a second duration of time. The retaining is responsive to receiving a number of client responses to the term sets above a second threshold. For instance, term sets have at least 100 client responses after two months will be retained as the second subset of term sets. As opposed to the removed subset, the corresponding genes of the second subset of term sets are retained in the gene pool (e.g., database 140 or algorithmic engine 120) for the computer-executed genetic algorithm. A field, such as a field in database 140 in FIG. 1, can be used to indicate records of term sets that have been indicated for retention.

The second subset of term sets is bred using the genetic algorithm at step 370 in FIG. 3. As with the encoding in step 320, the breeding process can be completed by one or more processors, such as ones in algorithmic engine 120 shown in FIG. 1. More specifically, the breeding can be completed by one or more processors in genetic algorithmic calculator 230 in FIG. 2.

At a step 380 in FIG. 3, a second plurality of term sets is generated based on results from breeding the genetic algorithm. If the term sets and products among the first plurality of products include financial products, the second term sets and products can include similar financial products. In some embodiments, term sets in the second plurality of term sets can include combinations of interest rates, fees, credit limits, and/or rewards structures that are the same as some combinations from the first plurality, with unsuccessful term sets removed from the plurality.

In some embodiments, generating a second plurality of terms sets can result in new term sets not found in the first plurality of term sets, such as by generating novel combinations of features. In some embodiments, generating a second plurality of term sets results in new attributes not previously found in the gene pool. For instance, a higher interest rate or lower interest rate than those included in the first plurality of term sets can be generated. Other attributes that can be altered during the breeding process will be apparent to one skilled in the relevant art.

Once the second plurality of term sets has been generated, the process can be re-iterated for a given population cluster. The second plurality of term sets can be treated as the first was previously treated, with re-setting of time periods. Thresholds can be monitored against this renewed period of time and newly generated term sets either removed or retained to complete subsequent generations of term sets for the given population cluster. There are no limits to the number of iterations that can be performed to the term sets, either with or without modifications, manually or automatically, to the thresholds, timeframes, term attributes, and client attributes as stored.

Figure 4:
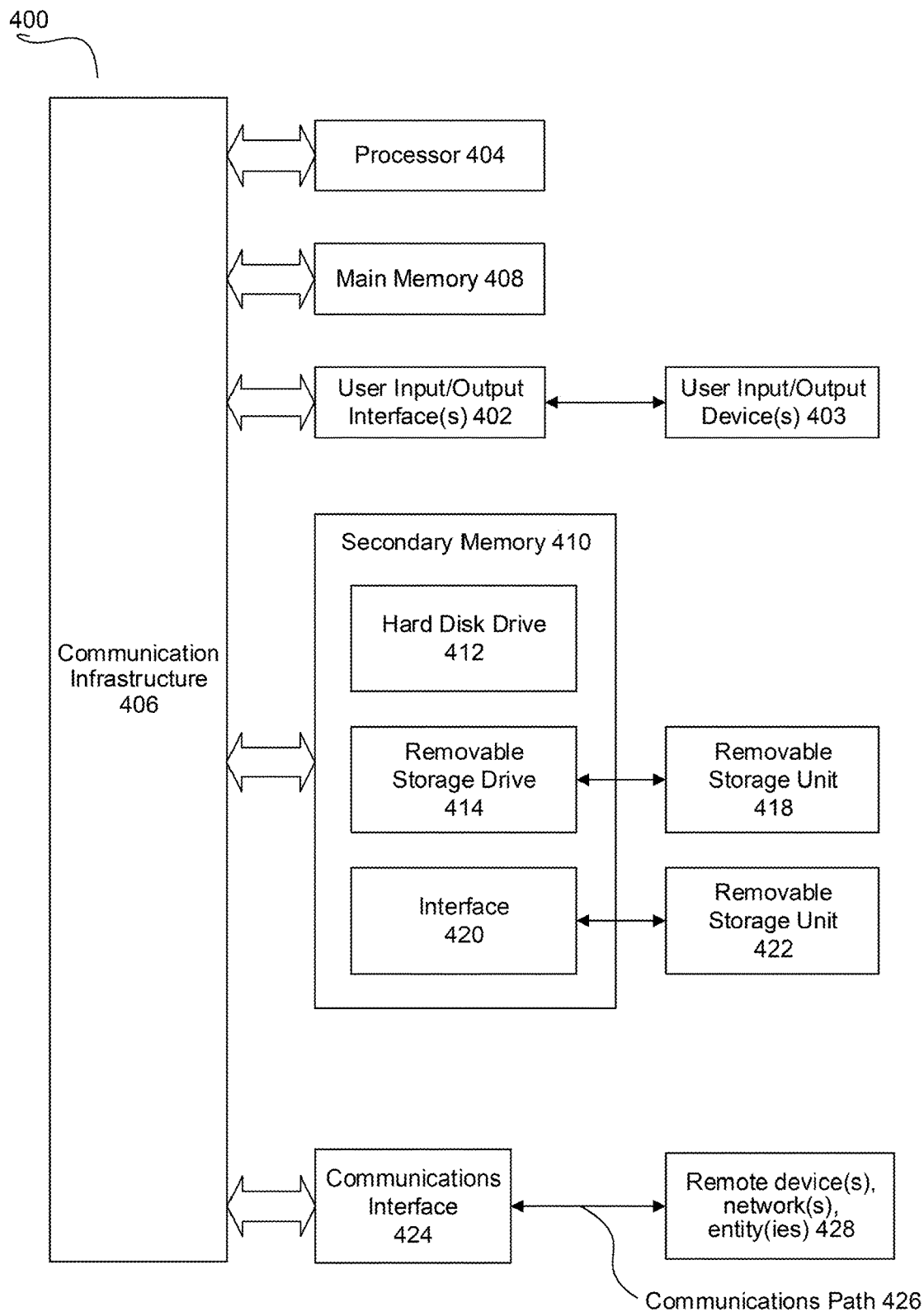
FIG. 4 is a computing environment suitable for implementing systems and methods of improving electronic delivery channels algorithmically, according to embodiments of the disclosure.

FIG. 4 depicts an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data. Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments, but should be defined only in accordance with the following claims and their equivalents.

What is claimed is:

1. A computer-implemented method of automatically generating new term sets from existing term sets, the method comprising:
   determining a first plurality of term sets, each term set within the first plurality of term sets having a corresponding set of term attributes;
   encoding each term attribute among the set of term attributes as a gene for a computer-executed genetic algorithm;
   clustering clients into categories based on client attributes, wherein the client attributes correspond to attributes of clients to whom the first plurality of term sets are to be transmitted;
   applying the computer-executed genetics algorithm to a category of clustered clients;
   distributing electronic communications including each of the first plurality of term sets to respective clients in the category of clustered clients, the electronic communications including a first offer related to each of the first plurality of term sets;
   determining a second duration of time based on one of the term attributes or the client attributes, the second duration of time comprising a shorter first duration of time after which at least a first subset of the first plurality of term sets is removed;
   determining a first response rate over the first duration of time over which to evaluate the first plurality of term sets relative to a first threshold;
   determining a first subset of the first plurality of term sets having a response rate less than the first threshold, and a second subset of the first plurality of term sets having a response rate greater than the first threshold;
   removing the first subset from at least one of a database or memory storing the first plurality of term sets for the category of clustered clients after the first duration of time;
   determining a second response rate over the second duration of time, continuing beyond the first duration of time, over which to evaluate the second subset relative to a second threshold;
   retaining a third subset from the second subset as successful term sets for the category of clustered clients after the second duration of time, the retaining responsive to the second response rate for the third subset being greater than the second threshold, wherein corresponding genes of the third subset are retained in a gene pool for the computer-executed genetic algorithm, wherein any remaining term sets included in the second subset and not retained in the third subset are removed;
   breeding the retained third subset using the computer-executed genetic algorithm;
   generating a second plurality of term sets for the category of clustered clients based on results from breeding the computer-executed genetic algorithm; and
   iterating the computer-executed genetic algorithm by treating the second plurality of term sets as the first plurality of term sets were previously treated, and comprising re-setting the first duration and the second duration.

2. The computer-implemented method of claim 1, further comprising distributing the second plurality of term sets to respective clients in the category of clustered clients.

3. The computer-implemented method of claim 2, further comprising removing, retaining, and generating subsequent pluralities of term sets for the category of clustered clients based on subsequent iterations of breeding the computer-executed genetic algorithm.

4. The computer-implemented method of claim 1, wherein generating the second plurality of term sets results in new term sets not found in the first plurality of term sets.

5. The computer-implemented method of claim 4, wherein generating the second plurality of term sets results in new attributes not found in the gene pool.

6. The computer-implemented method of claim 1, wherein the term attributes comprise interest rates, fees, credit limits, or rewards structures and wherein the client attributes comprise age, income, location, or spend habits.

7. The computer-implemented method of claim 1, wherein the first threshold and first duration of time are proportional to the second threshold and second duration of time.

8. The computer-implemented method of claim 1, wherein both the first duration of time and the second duration of time are based on the client attributes of clients to whom the first plurality of term sets are to be transmitted.

9. The computer-implemented method of claim 1, wherein the client attributes comprise one or more of demographic aspects of prospective clients, occupation, and credit rating.

10. A computer-readable storage medium having a set of computer-executable instructions stored thereon, execution of which, by one or more processing devices, causes the one or more processing devices to perform operations for automatically generating new term sets from existing term sets, the operations comprising:
   determining a first plurality of term sets, each term set within the first plurality of term sets having a corresponding set of term attributes;
   encoding each term attribute among the set of term attributes as a gene for a computer-executed genetic algorithm;
   clustering clients into categories based on client attributes, wherein the client attributes correspond to attributes of clients to whom the first plurality of term sets are to be transmitted;
   applying the computer-executed genetics algorithm to a category of clustered clients;
   distributing electronic communications including each of the first plurality of term sets to respective clients in the category of clustered clients, the electronic communications including a first offer related to each of the first plurality of term sets;
   determining a second duration of time based on one of the term attributes or the client attributes, the second duration of time comprising a shorter first duration of time after which at least a first subset of the first plurality of term sets is removed;
   determining a first response rate over the first duration of time over which to evaluate the first plurality of term sets relative to a first threshold;
   determining a first subset of the first plurality of term sets having a response rate less than the first threshold, and a second subset of the first plurality of term sets having a response rate greater than the first threshold;
   removing the first subset from at least one of a database or memory storing the first plurality of term sets for the category of clustered clients after the first duration of time;

determining a second response rate over the second duration of time, continuing beyond the first duration of time, over which to evaluate the second subset relative to a second threshold;

retaining a third subset from the second subset as successful term sets for the category of clustered clients after the second duration of time, the retaining responsive to the second response rate for the third subset being greater than the second threshold, wherein corresponding genes of the third subset are retained in a gene pool for the computer-executed genetic algorithm, wherein any remaining term sets included in the second subset and not retained in the third subset are removed;

breeding the retained third subset using the computer-executed genetic algorithm;

generating a second plurality of term sets for the category of clustered clients based on results from breeding the computer-executed genetic algorithm; and iterating the computer-executed genetic algorithm by treating the second plurality of term sets as the first plurality of term sets were previously treated, and comprising re-setting the first duration and the second duration.

11. The computer-readable storage medium of claim 10, further comprising distributing the second plurality of term sets to respective clients in the category of clustered clients.

12. The computer-readable storage medium of claim 10, further comprising removing, retaining, and generating subsequent pluralities of term sets for the category of clustered clients based on subsequent iterations of breeding the computer-executed genetic algorithm.

13. The computer-readable storage medium of claim 10, wherein generating the second plurality of term sets results in new term sets not found in the first plurality of term sets.

14. The computer-readable storage medium of claim 13, wherein generating the second plurality of term sets results in new attributes not found in the gene pool.

15. The computer-readable storage medium of claim 10, wherein the term attributes comprise interest rates, fees, credit limits, or rewards structures and wherein the client attributes comprise age, income, location, or spend habits.

16. A system for automatically generating new term sets from existing term sets, the system comprising:
    a database containing client information and a plurality of term sets; and
    a processor configured to communicate with the database, wherein the processor is further configured to
        receive client information and a first plurality of term sets from the database,
        cluster clients into categories based on the client information, the clustering performed according to a clustering algorithm,
        apply a computer-executed genetic algorithm to a category of clustered clients to distribute each of the first plurality of term sets to respective clients in the category of clustered clients;
        encode genes corresponding to attributes of the terms in the first plurality of term sets, wherein the genes are encoded for a computer-executed genetic algorithm;
        distribute electronic communications including each of the first plurality of term sets to respective clients in the category of clustered clients, the electronic communications including a first offer related to each of the first plurality of term sets;
        determine a second duration of time based on one of term attributes or client attributes, the second duration of time comprising a shorter first duration of time after which at least a first subset of the first plurality of term sets is removed;
        determine a first response rate over the first duration of time over which to evaluate the first plurality of term sets relative to a first threshold;
        determine a first subset of the first plurality of term sets having a response rate less than the first threshold, and a second subset of the first plurality of term sets having a response rate greater than the first threshold;
        remove the first subset from at least one of a database or memory storing the first plurality of term sets for the category of clustered clients after the first duration of time;
        determine a second response rate over the second duration of time, continuing beyond the first duration of time, over which to evaluate the second subset relative to a second threshold;
        retain a third subset from the second subset as successful term sets for the category of clustered clients after the second duration of time, the retaining responsive to the second response rate for the third subset being greater than the second threshold, wherein corresponding genes of the third subset are retained in a gene pool for the computer-executed genetic algorithm, wherein any remaining term sets included in the second subset and not retained in the third subset are removed;
        breed the retained third subset using the computer-executed genetic algorithm;
        generate a second plurality of term sets for the category of clustered clients based on results from breeding the computer-executed genetic algorithm;
        iterate the computer-executed genetic algorithm by treating the second plurality of term sets as the first plurality of term sets were previously treated, and comprising re-setting the first duration and the second duration; and
        distribute the second plurality of term sets to respective clients in the category of clustered clients.

17. The system of claim 16, wherein the processor is further configured to remove, retain, and generate subsequent pluralities of term sets based on subsequent iterations of breeding the computer-executed genetic algorithm.

18. The system of claim 16, further comprising a web interface configured to receive each of the plurality of term sets generated by the processor, and configured to transmit each of the plurality of term sets to the clients via internet.

19. The system of claim 16, wherein the processor is configured to generate the second plurality of term sets such that the generating results in new term sets not found in the first plurality of term sets.

20. The system of claim 19, wherein the processor is configured to generate the second plurality of term sets such that the generating results in new attributes not found in the gene pool.

* * * * *